(12) United States Patent
Yih et al.

(10) Patent No.: US 9,183,173 B2
(45) Date of Patent: Nov. 10, 2015

(54) LEARNING ELEMENT WEIGHTING FOR SIMILARITY MEASURES

(75) Inventors: Wen-tau Yih, Redmond, WA (US); Christopher A. Meek, Kirkland, WA (US); Hannaneh Hajishirzi, Urbana, IL (US)

(73) Assignee: Microsoft Technology Licensing, LLC, Redmond, WA (US)

(*) Notice: Subject to any disclaimer, the term of this patent is extended or adjusted under 35 U.S.C. 154(b) by 440 days.

(21) Appl. No.: 12/715,417

(22) Filed: Mar. 2, 2010

(65) Prior Publication Data
US 2011/0219012 A1 Sep. 8, 2011

(51) Int. Cl.
G06F 15/18 (2006.01)
G06F 17/30 (2006.01)

(52) U.S. Cl.
CPC .............. *G06F 15/18* (2013.01); *G06F 17/30* (2013.01)

(58) Field of Classification Search
CPC .... G06F 15/18; G06N 99/005; G06K 9/6256; G06K 9/6269; G06Q 10/10
USPC ................................................... 706/12, 62
See application file for complete search history.

(56) References Cited

U.S. PATENT DOCUMENTS

| 5,321,833 | A | 6/1994 | Chang et al. |
| 7,346,491 | B2 | 3/2008 | Kanagasabai et al. |
| 2008/0319973 | A1 | 12/2008 | Thambiratnam et al. |

OTHER PUBLICATIONS

Culotta et al, "Author Disambiguation using Error-driven Machine Learning with a Ranking Loss Function", Journal Article, (2007), Proceedings of the Sixth International Workshop on Information Integration on the Web (IWeb 2007).*
Bagdis, "Plagiarism Detection in Natural Language", A senior thesis submitted to the Computer Science Department of Princeton University, May 5, 2008.*
McKeever, "Online plagiarism detection services—saviour or scourge?", Plagiarism: Prevention, Practices and Policies, Newcastle upon Tyne, May 2004.*
Neill et al, "A Web-Enabled Plagiarism Detection Tool", IT Professional, vol. 6, No. 5, Sep./Oct. 2004.*
Scherbinin, "Plagiarism Detection: the Tool and the Case Study", e-Learning, IADIS (2008), p. 304-310.*
Walker et al, "A Spatial Similarity Ranking Framework for Spatial Metadata Retrieval", Combined 5th Trans Tasman Survey Conference & 2nd Queensland Spatial Industry Conference 2006—Cairns, Sep. 18-23, 2006.*
Wu et al, "Interpreting TF-IDF Term Weights as Making Relevance Decisions", ACM Transactions on Information Systems, vol. 26, No. 3, Article 13, Publication date: Jun. 2008.*
Xie et al, "Using Corpus and Knowledge-Based Similarity Easure in Maximum Marginal Relevance for Meeting Summarization", International Conference on Acoustics, Speech and Signal Processing, 2008. ICASSP, 200B. IEEE, Mar. 31 2008-Apr. 4 2008, pp. 4985-4988.*

(Continued)

*Primary Examiner* — Jeffrey A Gaffin
*Assistant Examiner* — Ilya Traktovenko
(74) *Attorney, Agent, or Firm* — Sandy Swain; Judy Yee; Micky Minhas (57) ABSTRACT

Described is a technology for measuring the similarity between two objects (e.g., documents), via a framework that learns the term-weighting function from training data, e.g., labeled pairs of objects, to develop a learned model. A learning procedure tunes the model parameters by minimizing a defined loss function of the similarity score. Also described is using the learning procedure and learned model to detect near duplicate documents.

20 Claims, 5 Drawing Sheets

(56) References Cited

OTHER PUBLICATIONS

Yang et al, "Text Categorization Based on a Similarity Approach", ISKE-2007 Proceedings, Oct. 2007.*
Bifet et al, "An Analysis of Factors Used in Search Engine Ranking", Technical University of Catalonia, University of Chile, Apr. 8, 2005.*
Zhai, "Statistical Language Models for Information Retrieval a Critical Review", Foundations and Trends in Information Retrieval, vol. 2, No. 3 (2008) 137-213.*
Debole, et al., "Supervised Term Weighting for Automated Text Categorization", Retrieved at <<http://www.ercim.org/publication/Ercim_News/enw56/sebastiani.html>>, ERCIM News No. 56, Jan. 2004, p. 1.
Lewis, et al., "Text Similarity: An Alternative Way to Search MEDLINE", Retrieved at <<http://bioinformatics.oxfordjournals.org/cgi/content/full/22/18/2298>>, Aug. 22, 2006, pp. 16.
Higgins, et al., "Sentence Similarity Measures for Essay Coherence", Retrieved at <<http://www.ets.org/Media/Research/pdf/erater_sentence_similarity.pdf>>, This paper appeared in the published proceedings of the 7th International Workshop on Computational Semantics, Jan. 2007, pp. 12.
France, Robert K., "Weights and Measures: An Axiomatic Model for Similarity Computation", Retrieved at <<http://www.dlib.vt.edu/reports/WeightsMeasures.pdf>>, Jul. 28, 2007, pp. 14.
Mohri, et al., "A New Quality Measure for Topic Segmentation of Text and Speech", Retrieved at <<http://cs.nyu.edu/~eugenew/publications/topic-tcm.pdf>>, Oct. 29, 2009, pp. 4.
Corley, et al., "Measuring the Semantic Similarity of Texts", Retrieved at <<http://www.cse.unt.edu/~rada/papers/corley.acl05.emsee.pdf>>, Oct. 29, 2009, pp. 6.
Bilenko, et al., "Adaptive Duplicate Detection using Learnable String Similarity Measures", Retrieved at <<https://research.microsoft.com/en-us/um/people/mbilenko/papers/03-marlin-kdd.pdf>>, Proceedings of the Ninth ACM SIGKDD International Conference on Knowledge Discovery and Data Mining, Aug. 24-27, 2003, pp. 39-48.
Bromley, et al., "Signature Verification Using a "Siamese" Time Delay Neural Network", Retrieved at <<http://yann.lecun.com/exdb/publis/pdf/bromley-94.pdf>>, 1994, pp. 737-739.
Burges, et al., "Learning to Rank Using Gradient Descent", Retrieved at <<http://portal.acm.org/ft_gateway.cfm?id=1102363&type=pdf&coll=GUIDE&dl=GUIDE&CFID=60353874&CFTOKEN=69244641>>, Appearing in Proceedings of the 22nd International Conference on Machine Learning, Bonn, Germany. 2005, pp. 89-96.
Carterette, et al., "Here or There: Preference Judgments for Relevance", Retrieved at <<http://research.microsoft.com/en-us/um/people/sdumais/ECIR08-CarteretteEtAl-Final.pdf>>, 2008, pp. 12.
Chopra, et al., "Learning a Similarity Metric Discriminatively, with Application to Face Verification", Retrieved at <<http://yann.lecun.com/exdb/publis/pdf/chopra-05.pdf>>, 2005, pp. 8.
Cortes, et al., "AUC Optimization vs Error Rate Minimization", Retrieved at <<http://www.cs.nyu.edu/~mohri/postscript/auc.pdf>>, 2004, pp. 8.
Cristianini, et al., "On Kernel-Target Alignment", Retrieved at <<http://citeseer.ist.psu.edu/rd/2295445%2C480615%2C1%2C0.25%2CDownload/http://citeseer.ist.psu.edu/cache/papers/cs/25681/http:zSzzSzwww.support-vector.netzSzpaperszSznips01_alignment.pdf/cristianini01kerneltarget.pdf>>, 2002, pp. 7.

Deerwester, et al., "Indexing by Latent Semantic Analysis", Retrieved at <<http://lsi.research.telcordia.com/lsi/papers/JASIS90.pdf>>, Apr. 5, 1998, pp. 34.
Dekel, et al., "Log-Linear Models for Label Ranking", Retrieved at <<books.nips.cc/papers/files/nips16/NIPS2003_AA63.pdf>>, 2003, pp. 8.
Domingos, Pedro, "MetaCost: A General Method for Making Classifiers Cost-Sensitive", Retrieved at <<http://citeseer.ist.psu.edu/rd/96244527%2C202745%2C1%2C0.25%2CDownload/http://citeseer.ist.psu.edu/cache/papers/cs/8250/http:zSzzSzwww.gia.ist.utl.ptzSz~pedrodzSzkdd99.pdf/domingos99metacost.pdf>>, 1999, pp. 10.
Goodman, et al., "Implicit Queries for email", Retrieved at <<http://www.ceas.cc/papers-2005/141.pdf>>, 2005, pp. 8.
Jones, et al., "Generating Query Substitutions", Retrieved at <<http://www2006.org/programme/files/pdf/3100.pdf>>, May 23-26, 2006, pp. 10.
Lin, Dekang, "Automatic Retrieval and Clustering of Similar Words", Retrieved at <<http://www.cs.ualberta.ca/~lindek/papers/acl98.pdf>>, 1998, pp. 8.
Manning, et al., "Introduction to Information Retrieval", Retrieved at <<http://nlp.stanford.edu/IR-book/pdf/irbookonlinereading.pdf>>, Apr. 1, 2009, pp. 581.
Metzler, et al., "Similarity Measures for Short Segments of Text", Retrieved at <<http://ciir.cs.umass.edu/~metzler/metzler_186.pdf>>, 2007, pp. 12.
Mihalcea, et al., "Corpus-based and Knowledge-based Measures of Text Semantic Similarity", Retrieved at <<http://www.cse.unt.edu/~rada/papers/mihalcea.aaai06.pdf>>, 2006, pp. 6.
Morik, et al., "Combining Statistical Learning with a Knowledge-based Approach—A Case Study in Intensive Care Monitoring", Retrieved at <<http://www.cs.cornell.edu/People/tj/publications/morik_etal_99a.pdf>>, 1999, pp. 10.
Sahami, et al., "A Web-based Kernel Function for Measuring the Similarity of Short Text Snippets", Retrieved at <<http://robotics.stanford.edu/users/sahami/papers-dir/www2006.pdf>>, May 23-26, 2006, pp. 10.
Sheng, et al., "Get Another Label? Improving Data Quality and Data Mining using Multiple, Noisy Labelers", Retrieved at <<http://pages.stern.nyu.edu/~panos/publications/kdd2008.pdf>>, KDD'08, Aug. 24-27, 2008, pp. 9.
Yih, et al., "Improving Similarity Measures for Short Segments of Text", Retrieved at <<http://research.microsoft.com/pubs/73713/YihMeek07.pdf>>, 2007, pp. 6.
Yih, et al., "Finding Advertising Keywords on Web Pages", Retrieved at <<http://research.microsoft.com/pubs/73692/YihGoCa-www06.pdf>>, May 23-26, 2006, pp. 10.
Bishop, Christopher M., "Neural Networks for Pattern Recognition", Retrieved at <<http://www.engineering.upm.ro/master-ie/sacpi/mat_did/info068/docum/Neural%20Networks%20for%20Pattern%20Recognition.pdf>>, Oxford Press, 1995, pp. 498.
Herbrich, et al., "Large Margin Rank Boundaries for Ordinal Regression", Retrieved at <<http://research.microsoft.com/apps/pubs/default.aspx?id=65610>>, Mar. 26, 2000, pp. 115-132.
Nocedal, et al., "Numerical Optimization", Retrieved at <<http://faculty.bracu.ac.bd/~faruqe/books/numericalanalysis/Numerical%20Optimization%202ed.pdf>>, Springer, Second Edition, 1999, pp. 683.

* cited by examiner

LEARNING ELEMENT WEIGHTING FOR SIMILARITY MEASURES

BACKGROUND

Measuring the similarity between two texts is a fundamental problem in many natural language processing and information retrieval applications. Widely used similarity measures are vector-based methods, in which the texts being compared are each represented by a term vector, where each term is associated with a weight that indicates its importance. A similarity function, such as a cosine measure (e.g., that compares the inner product of two normalized unit term vectors, or equivalently a linear kernel) or other kernel functions such as the Gaussian kernel, may be used.

Factors that decide the quality of a vector-based similarity measure include the vector operation that takes as input the term vectors and computes the final similarity score (e.g., cosine). Another factor is how these term vectors are constructed, including the term selection process and how the weights are determined. For example, a TF-IDF (term frequency-inverse document frequency) scheme for measuring document similarity may follow a bag-of-words strategy to include all the words in the document when constructing the term vectors. The weight of each term is the product of its term frequency (i.e., the number of occurrences in the document) and inverse document frequency (i.e., the number of documents in a collection that contain this term).

While simple and reasonably performant, such approaches have a number of weaknesses. For example, when more information is available, such as the position of a term in the document or whether a term is part of an anchor text, incorporating that information in the similarity measure may not be easy.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a model that produces a similarity measure between a set of objects is learned via a framework. The framework represents objects as vectors and learns the values of vector elements (e.g., weights) by accessing labeled training data, and using the labeled training data to learn model parameters that minimize a loss function.

In one aspect, the values of the vector elements are learned based upon a functional form of the element value with parameters to learn, the similarity function for computing a similarity score given the vectors, and the loss function of computed similarity scores and labels of the vectors. These may be defined/selected for a given objective, e.g., determining a similarity score between pairs of objects, detecting near duplicate documents, retrieved document ranking, and so forth.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards learning a term-weighting function for use in comparing objects represented by vectors. Given labeled pairs of texts as training data, a learning procedure tunes model parameters by minimizing the specified loss function of the similarity score. Compared to traditional TF-IDF term-weighting schemes, this approach significantly improves natural language processing and information retrieval tasks, such as judging the quality of query suggestions and/or filtering irrelevant ads for online advertising, for example.

It should be understood that any of the examples described herein are non-limiting examples. As one example, while terms of text and the like are described herein, any objects that may be evaluated for similarity may be considered, e.g., images, email messages, rows or columns of data and so forth. Also, objects that are "documents" as used herein may be unstructured documents, pseudo-documents (e.g., constructed from other documents and/or parts of documents, such as snippets), and/or structured documents (e.g., XML, HTML, database rows and/or columns and so forth). As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing, natural language processing and information retrieval in general.

Figure 1:
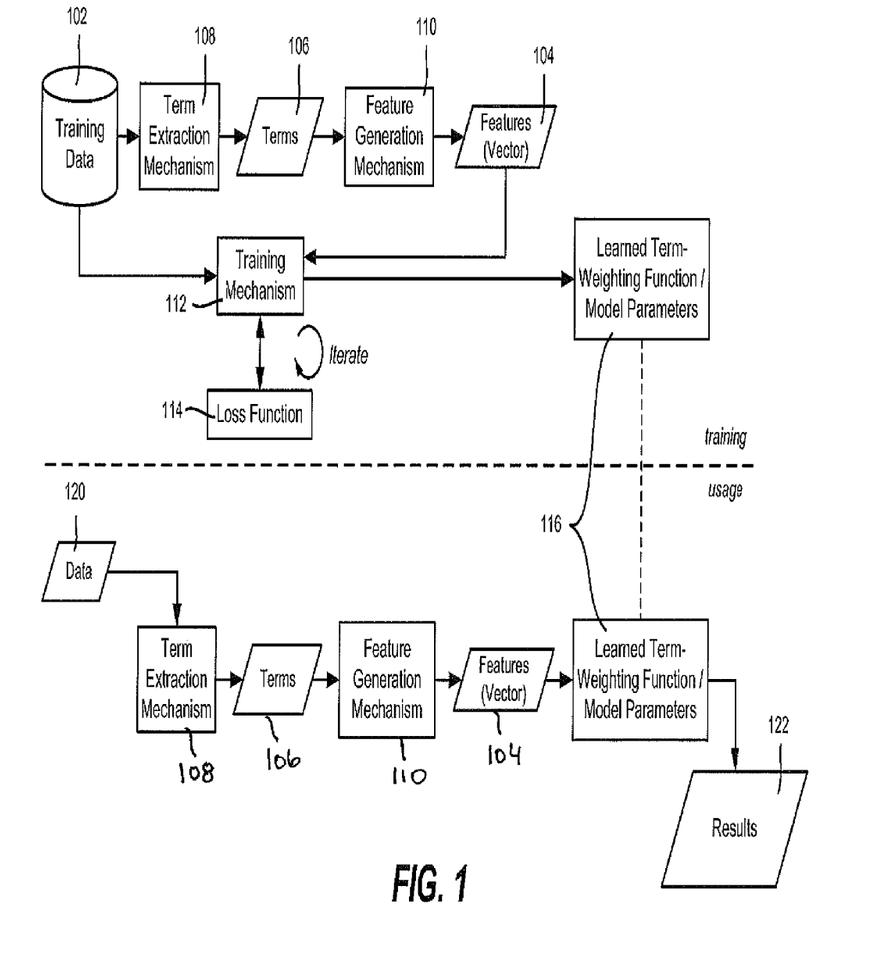
FIG. 1 is a block diagram showing example components for training and using a model with learning element weighting for similarity measures.

FIG. 1 shows various aspects related to a general term-weighting learning framework that learns the term-weighting function for the vector-based similarity measures. In general, labeled training data 102, such as containing objects (e.g., documents) with similarity-related labels, are processed into features 104 which correspond to vectors. To this end, terms 106 are extracted by a term extraction mechanism 108, and the features generated for those terms by a feature generation mechanism 110.

Various features/feature sets may be used, including term frequency and document frequency (TF&DF), plain-text and HTML. For example, a TF&DF feature set contains log(tf+1), log(df+1) and a bias term (e.g., 1), where tf is the number of times the term occurs in the original document/pseudo-document, df is the number of documents in the collection that contain this term.

A second feature set, plain-text, includes of some or all of the TF&DF features along with a query frequency feature, capitalization feature and location and length-based features.

This set of features can be used for regular text documents that do not have special formatting information.

The query frequency feature is based on the search engine query log, which reflects the distribution of the words/phrases in which searchers are interested. One implementation uses log(qf+1) as feature, where of is the query frequency. The capitalization feature is based upon the observation that a capitalized word may indicate that it is part of a proper noun or possibly more important. In one implementation, when the term is capitalized in at least one occurrence in the document/pseudo-document, the value of this feature is 1; otherwise, it is 0.

The location and length features are based on the observation that the beginning of a regular document often contains a summary with words that are likely important. In pseudo-documents created using search snippets, words that occur in the beginning come from the top results, which are potentially more relevant to the original query/suggestion. If loc represents the word position of the target term and len represents the total number of words of this pseudo-document, in one implementation the logarithmic value log(loc+1) and the ratio loc/len are used as features. In order for the learning procedure to adjust the scaling, the logarithmic value of the document length, log(len+1), was also used.

Another feature set is HTML, composed of some or all of the features used in the plain-text feature set plus features extracted from some special properties of web documents. Example features include hypertext; the anchor text in an HTML document usually provides valuable information, and if there is at least one occurrence of the term that appears in some anchor text, the value of this feature is 1; otherwise, it is 0. Another feature is the URL representing the name of the document; if a term is a substring of the URL, then the value of this feature for the term is 1; otherwise, it is 0. Title is another feature; the value of this feature is 1 when the term is part of the title; otherwise, it is 0. A meta feature is also used; besides the title, several meta tags in the HTML header may explicitly show keywords as selected by the page author, and thus whether the term is part of a meta-keyword may be used as a binary feature. Whether a term is in the meta-description segment also may be used.

A training mechanism 112 controls the processing of the data, e.g., iteratively adjusting the parameters so as to minimize a loss function 114, as described below. When finished, a learned term weighting function with the corresponding model parameters 116 is obtained.

In usage, new unknown data 120 for an object is processed in a similar manner to obtain a feature vector that represents that object. When processed through the learned model 116, results 122 such as a similarity score or ranking against other feature vectors representing other objects may be used as desired.

Instead of using a fixed formula to decide the weight of each term, the framework uses a parametric function of features of each term, where the model parameters are learned from labeled data. Note that while the weight of each term conceptually represents its importance with respect to the document, tuning the model parameters to optimize based upon labeled terms may not be the best strategy. For one, while a label (e.g., yes/no) that indicates whether a pair of texts is similar to one another is not difficult to collect from human annotators, a label as to whether a term in a document is "important" is often very ambiguous and hard to decide. Even if such annotation issues can be resolved, aligning the term weights with the true importance of each term may not necessarily lead to deriving a better similarity measure for the target application. Therefore, the learning framework assumes that it is given only the labels of the pairs of texts being compared, such as whether the two texts are considered similar by human labelers.

With respect to the loss function 114, the framework is flexible in choosing among various loss functions that help obtain the desired objectives, while still maintaining the simplicity of vector-based similarity measures. For example, a system that implements the TF-IDF cosine measure can replace the original term-weighting scores with the ones output by the framework without changing other portions of the algorithm. The framework also provides other advantages, e.g., it does not learn the scores of all the terms in the vocabulary directly; because the vocabulary size is typically large in the text domain (e.g., all possible words in English), learning directly the term-weighting scores may suffer from data sparsity and cannot generalize well in practice. Instead, learning the model parameters for features that each term may have results in a much smaller feature space.

Further, the framework effectively learns a new similarity measure by tuning the term-weighting function, which can be potentially complementary to other approaches. For example, in applications such as judging the relevance of different query suggestions and determining whether a paid-search advertisement is related to the user query, the technology described herein allows for incorporating various kinds of term—document information; (and in practice learns a term-weighting function that significantly outperforms traditional TF-IDF schemes in several evaluation metrics, when using the same vector operation (e.g., cosine) and the same set of terms).

By way of an example, assume that the texts being compared are two documents. A general architecture of vector-based similarity measures can be formally described as, given two documents $D_p$ and $D_q$, a similarity function maps them to a real-valued number, where a higher value indicates these two documents are semantically more related, as considered by the measure. Suppose a pre-defined vocabulary set $V=\{t_1, t_2, \ldots, t_n\}$ comprises the set of possible terms (e.g., tokens, words) that may occur in the documents. Each document $D_p$ is represented by a term vector of length n: $v_p = \{s_p^1, s_p^2, \ldots, s_p^n\}$ where $s_p^i \in R$ is the weight of term $t_i$, and is determined by the term-weighting function tw that depends on the term and the document, i.e., $S_p^i \equiv tw_w(t_i, D_p)$. The similarity between documents $D_p$ and $D_q$ is then computed by a vector operation function $f_{sim:(v_p,v_q)} \to R$.

Determining the specific functions $f_{sim}$ and tw effectively decides the final similarity measure. For example, the functions that construct the traditional TF-IDF cosine similarity can be:

$$f_{sim(v_p,v_q)} = \frac{v_p \cdot v_q}{\|v_p\| \cdot \|v_q\|} \qquad (1a)$$

As an alternative, a Jaccard coefficient function may be used:

$$f_{sim(v_p,v_q)} = \frac{v_p \cdot v_q}{\|v_p\|^2 + \|v_q\|^2 - v_p \cdot v_q} \qquad (1b)$$

The term weighting function may be represented as:

$$tw(t_i, D_p) \equiv tf(t_i, D_p) \cdot \log\left(\frac{N}{df(t_i)}\right) \qquad (2)$$

where N is the size of the document collection for deriving document frequencies, $tf$ and $df$ are the functions computing the term frequency and document frequency, respectively.

In contrast to other systems, the technology described herein also takes a specified vector function $f_{sim}$, but assumes a parametric term-weighting function $tw_w$. Given the training data, the mechanism learns the model parameters w that optimize for the designated loss function.

In one implementation of a learning framework, the term-weighting function comprises a linear combination of features extracted from the input term and document. In particular, the weight of term $t_i$ with respect to document $D_p$ is:

$$S_p^i = tw_w(t_i, D_p) = \Sigma_j w_j \phi_j(t_i, D_p), \quad (3)$$

where $\phi_j$ is the j-th feature function and $w_j$ is the corresponding model parameter.

With respect to the vector operation function $f_{sim}$, the same cosine function of equation (1) may be used. However, other smooth functions can alternatively be used.

The choice of the loss function for training model parameters depends on the desired objective in the target application. Two different learning settings are considered as examples herein, namely learning the similarity metric directly and learning the preference ordering.

Turning to learning the similarity metric, assume that the learning algorithm is given a set of document pairs. Each pair is associated with a label that indicates whether these two documents are similar (e.g., a binary label where 1 means similar and 0 otherwise) or the degree of similarity (e.g., a real-valued label that ranges from 0 to 1 or another range), e.g., as considered by human labelers. A training set of m examples can be denoted as:

$$\{(y_1,(D_{p_1},D_{q_1})),(y_2,(D_{p_2},D_{q_2})),\ldots,(y_m,(D_{p_m},D_{q_m}))\},$$

where $y_k$ is the label and $(D_{p_k}, D_{p_k})$ is the pair of documents to compare.

Following the vector construction described in Equation (3), let $v_{p_1}, v_{q_1} \ldots, v_{p_m}, v_{q_m}$ be the corresponding term vectors of these documents.

While any suitable loss function may be used, examples of two commonly used loss functions are sum-of-squares (sum squared) error (equation (4)) and log loss (equation (5)):

$$L_{sse}(\lambda) = \frac{1}{2}\sum_{k=1}^{m}(y_k - f_{sim}(v_{p_k}, v_{q_k}))^2 \quad (4)$$

$$L_{log}(\lambda) = \sum_{k=1}^{m} -y_k \log(f_{sim}(v_{p_k}, v_{q_k})) - (1 - y_k)(1 - \log f_{sim} vpk, vqk) \quad (5)$$

Equations (4) and (5) can further be regularized by adding $$\frac{\alpha}{2}\|\lambda\|^2$$

in the loss function, which may improve the performance empirically and also constrain the range of the final term-weighting scores. Learning the model parameters for minimizing these loss functions can be done using standard gradient-based optimization methods, such as the L-BFGS method that finds a local minimum with fast convergence. Note that other loss functions can alternatively be used in this framework.

In many applications where a similarity measure is applied, a goal is to obtain a ranked list of the candidate elements. For example, in the task of filtering irrelevant advertisements, a good similarity measure is expected to rank relevant advertisements higher than the irrelevant ones. A desired tradeoff of false-positive (mistakenly filtered relevant advertisements) and false-negative (unfiltered irrelevant advertisements) can be achieved by selecting a decision threshold. The exact value of the similarity measure in such tasks is not significant; rather for such tasks it is more significant that the model parameters better predict the pairwise preference.

In the setting of learning preference ordering, each training example may comprise two pairs of documents, associated with a label indicating which pair of documents is considered more preferable. A training set of m examples can be formally denoted as $\{(y_1,(x_{a_1}, x_{b_1})), (y_2,(x_{a_2}, x_{b_2})), \ldots, (y_m,(x_{a_m}, x_{a_m}))\}$ where $$x_{a_k} = (D_{p_{a_k}}, D_{q_{a_k}}) \text{ and } y_k = \in \{0, 1\}$$

indicates the pairwise order preference, where 1 means $x_{a_k}$ should be ranked higher than $x_{b_k}$ and 0 otherwise. A suitable loss function is shown below, where $\Delta_k$ is the difference of the similarity scores of these two document pairs:

$$\Delta_k = f_{sim}(v_{a_k}, v_{q_{a_k}}) - f_{sim}(v_{b_k}, v_{q_{b_k}}).$$

The loss function L, which can be shown to upper bound the pairwise accuracy (i.e., the 0-1 loss of the pairwise predictions), is:

$$L(w) = \Sigma_{k=1}^{m} \log(1 + \exp(-y_k \cdot \Delta_k - (1 y_k) \cdot (-\Delta_k))) \quad (6)$$

Equation (6) can further be regularized by adding $$\frac{\alpha}{2}\|\lambda\|^2$$

in the loss function.

Figure 2:
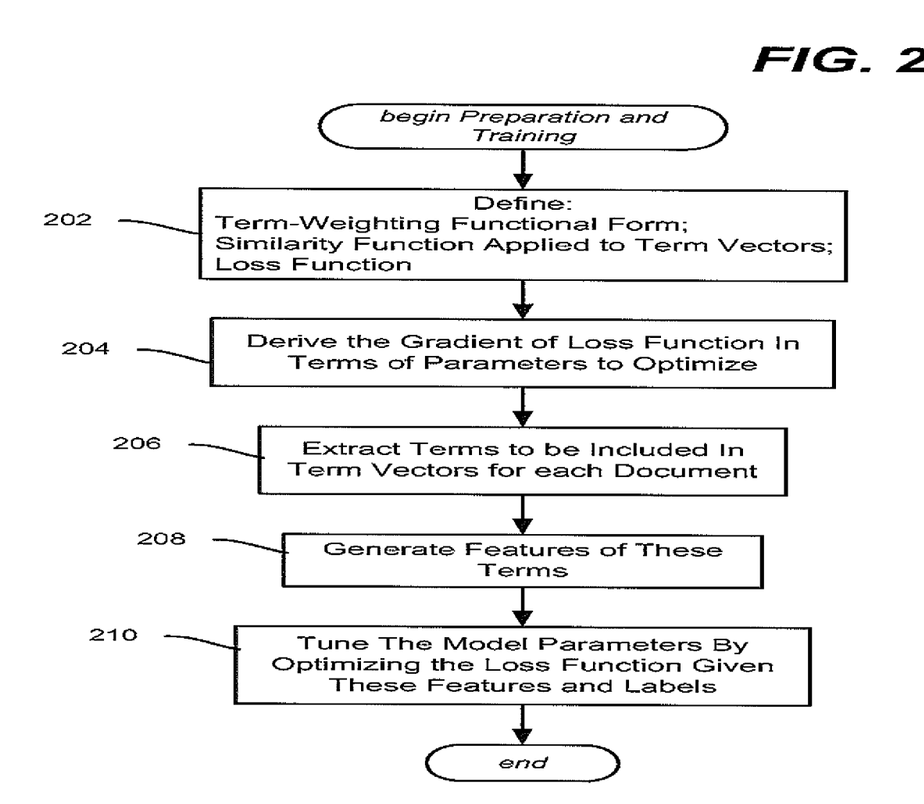
FIG. 2 is a flow diagram showing example steps that may be taken to prepare and train a learned model.
Figure 3:
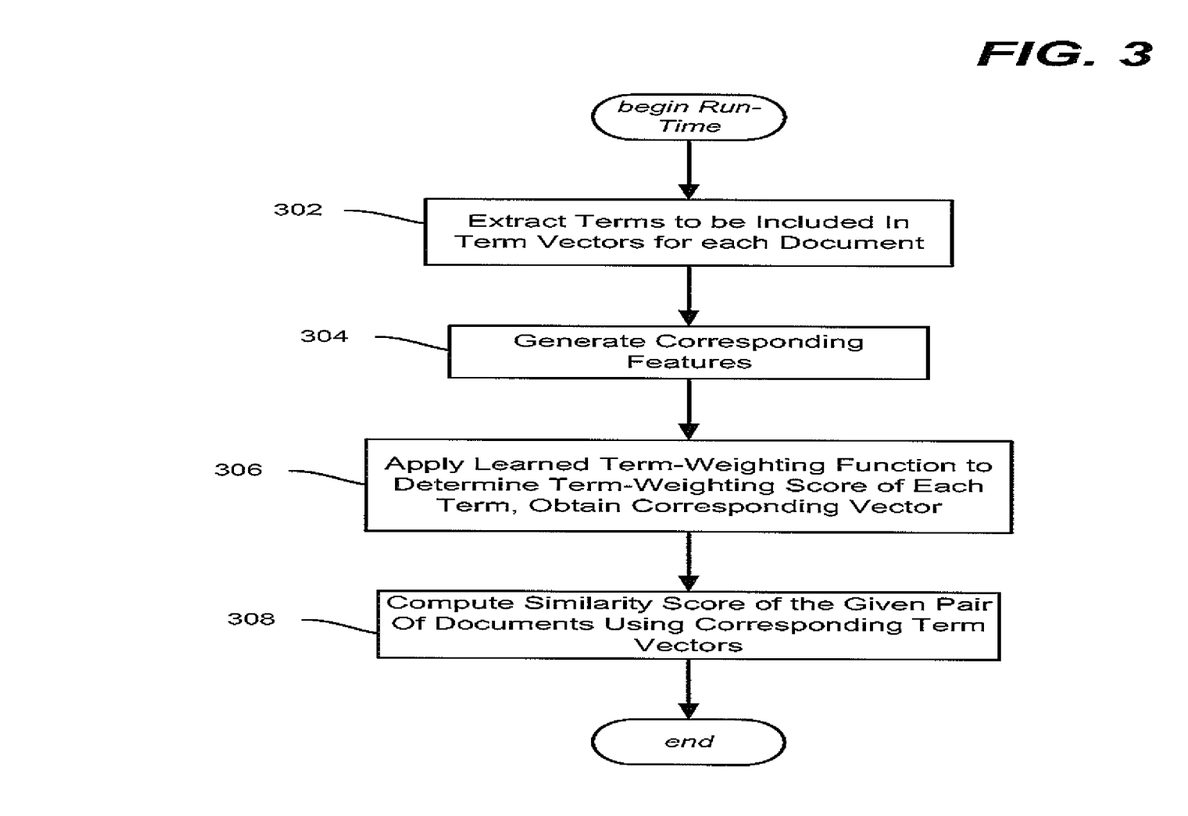
FIG. 3 is a flow diagram showing example steps that may be taken to use the learned model to obtain term-weighting scores for computing the similarity score of a pair of objects (e.g., documents).

FIGS. 2 and 3 exemplify general steps in the preparation and training stages, and usage (run-time) stages, respectively. Steps 202 and 204 represent a preparation stage, including step 202 where the various options are defined (which includes selecting from existing options such as known loss functions) based upon the application and the desired objective. Such options include defining the term-weighting functional form, the similarity function to be applied to the term vectors, and the loss function. Step 204 represents the gradient derivation of the loss function in terms of the parameters to optimize.

Steps 206 forward represent the training stage, including term extraction at step 206 and feature generation at step 208. Step 210 represents the tuning operation as described above.

At runtime as generally represented in FIG. 3, at step 302 the terms are extracted for one or more objects. Note that this may be a pair of objects to compare, or a new object to compare against pre-computed vectors of other objects, e.g., advertisements. However, in this example, the objects comprise a pair of documents to compare. Step 304 represents generating the features.

Step 306 applies the learned term-weighting function to determine the term-weighting score of each term. This provides the corresponding vectors to compare, with the comparison represented by step 308, e.g., computing a similarity score of the given pair of documents using the corresponding term vectors.

By way of a more particular example of how the similarity learning framework may be used, consider near-duplicate document detection, such as to find near-duplicate web pages, e.g., those from different mirrored sites that may be almost identical except for a header or footnote that denotes the site URL and the recent document update time. Similarly, news articles shown on different portals may come from the same source and thus have identical content, but be presented in different site templates with advertisements. In these examples, a search engine should not show these near-duplicate documents together, because they carry identical information. A web crawler also may eliminate near-duplicate documents to save storage and to reduce computational cost during retrieval. Another scenario is plagiarism detection; note however that the definition of what comprises near-duplicate documents may be relatively loose, e.g., when a portion of one document, such as a sentence or a paragraph, is contained in another document, these two documents may be seen as near-duplicates. Yet another definition of a near-duplicate is provided in an anti-adversarial scenario, in which spam messages that belong to the same campaign may look very different because spammers often randomize their messages by adding unrelated paragraphs at the end or by obfuscating terms. However, as long as the core payload text (e.g., an URL pointing to the spammer's site) is identical, two email messages may be treated as near-duplicates.

Two considerations when solving the near-duplicate document detection problem include efficiency and accuracy. Applications of near-duplicate document detection typically need to handle a very large collection of documents. For example, web crawling processes billions of web pages, whereby a practical near-duplicate document detection algorithm needs to determine whether a page is a near-duplicate of some documents in the repository in real-time. At the same time, near-duplicate document detection accuracy needs to be considered.

Figure 4:
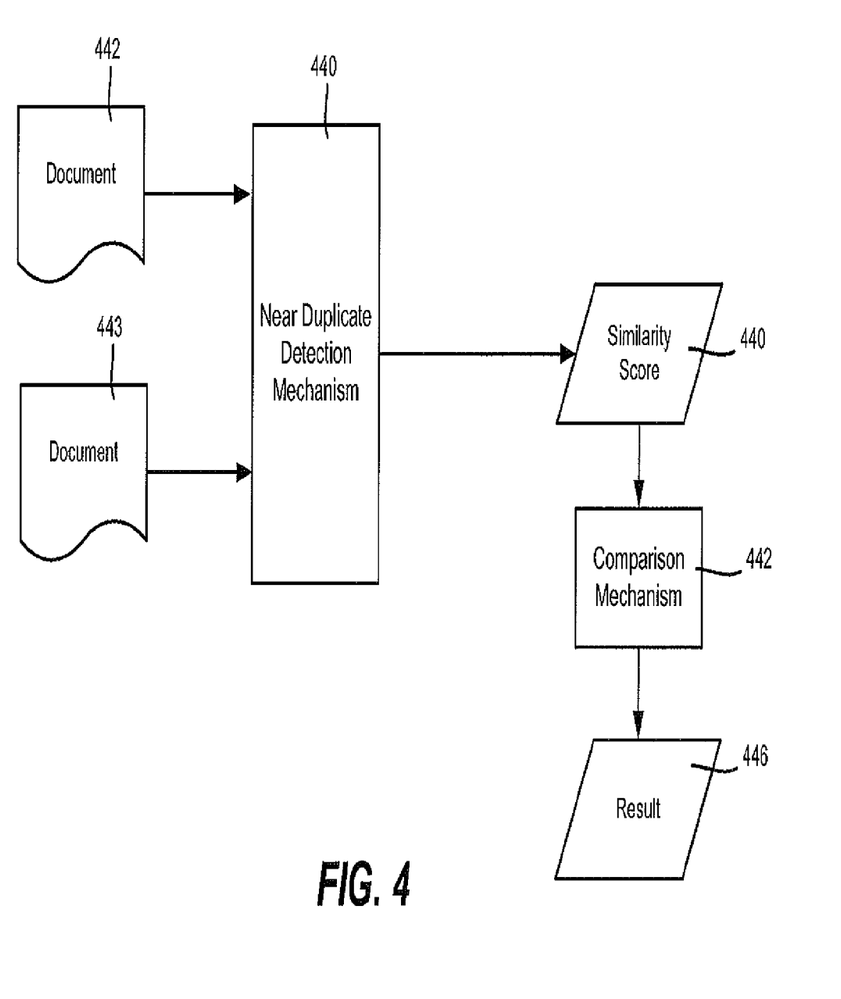
FIG. 4 is a block diagram showing an example of how the learned model may be used as part of near duplicate document components.

Described herein with reference to FIG. 4 is a near-duplicate document detection mechanism 440 using machine learning to facilitate efficiency and accuracy. Given a small set of labeled documents that denote near-duplicate clusters, the mechanism learns a vector representation of a document 442 as described above. Each element in this vector corresponds to a term or a short token sequence associated with a real-valued weight. The weight of each element can be interpreted as the importance of that element for computing a similarity score 444 to predict whether two documents 442 and 443 are near-duplicate. As described above, the model is automatically tuned based on labeled data. Further, the mechanism uses an expressive raw document representation, which contains additional useful information; as a result, comparable and often higher accuracy can be achieved regardless of the target domain without sacrificing computational efficiency (by using established signature generation techniques as described below).

In one implementation, documents 442 and 443 being compared are first encoded as vectors of k-grams. Two documents are considered near-duplicate if the similarity score 444 returned by a desired similarity function operating on the corresponding k-gram vectors, is above a predefined threshold, e.g., with the result 446 output by a comparison mechanism 448 that evaluates the similarity score 444 against the predefined threshold. In this implementation, a conceptual pipeline is provided comprising three general steps, namely generating k-gram vectors from documents, selecting a desired similarity function and efficiently computing the similarity score.

Thus, as generally described above, the mechanism 440 encapsulates documents into a vector representation. Each document d is mapped to a sparse vector $v_d$, comprising the k-grams found in d. In addition, each k-gram is associated with a weighting score, which can be interpreted as the importance of this k-gram with respect to document d.

More particularly, to ensure that the raw k-gram vector is an appropriate representation of the document for computing reliable document similarity scores, these vectors are real-valued vectors where the weights of the active k-grams are learned from labeled document pairs, using the above-described framework. Note that unlike other algorithms, each k-gram in the vector is associated with a real weight, which is used in computing document similarity scores. The active k-grams may be treated equally during signature generation and/or similarity computation.

To learn real-valued k-gram vectors, the raw document representation defines the real-valued k-gram vector, in which $V=\{g_1, g_2, \ldots, g_n\}$ is the vocabulary set that contains the possible k-grams occurring in the documents. Each document d is mapped to a sparse vector v, comprising the k-grams $G \subseteq V$ that can be found or selected in d. For each k-gram $g \in G$, its score $s_g$ is decided by a function that depends on the k-gram and/or the document;

$$s_g = g w_{\overline{\lambda}}(g,d),$$

where $\overline{\lambda}$ represents the model parameters learned from the labeled data.

Conceptually, this weighting function indicates how likely important the k-gram is with respect to the document, when computing the similarity between two vectors. While there are various choices of the functional form of $s_g$, one implementation uses a simple linear combination of features extracted for each k-gram $g_i$ occurring in document $d_p$:

$$S_p^i = g w_\lambda(g_i, d_p) = \Sigma_j \lambda_j \cdot \phi_j(g_i, d_p) \qquad (7)$$

where $\phi_j$ is the j-th feature function and $\lambda_j$ is the corresponding model parameter. The general goal of the training procedure is to determine $\overline{\lambda}$ so that two near-duplicate documents have a high similarity score.

Given two documents $d_p$ and $d_q$, their similarity score is given by a specified similarity function $f_{sim}$ operating on their corresponding k-gram vectors $v_p$ and $v_q$. As described above with reference to equations (1a) and (1b), the similarity functions of cosine and the (extended) Jaccard coefficient may be used:

$$\cos_{(v_p, v_q)} = \frac{v_p \cdot v_q}{\|v_p\| \cdot \|v_q\|}$$

$$jacc_{(v_p, v_q)} = \frac{v_p \cdot v_q}{\|v_p\|^2 + \|v_q\|^2 - v_p \cdot v_q}$$

Because manual scoring of the importance of each k-gram that leads to a robust similarity measure is a difficult annotation task, clusters of documents may be used as the labeled data. Documents belonging to the same clusters are near-duplicate and unrelated otherwise, and using such labeled documents to train the model parameters depends on the learning setting. Common choices include directly learning the similarity metric and learning the preference ordering.

To directly learn the similarity metric, the clusters of documents are used to generate a training set of N examples, denoted as:

$$(y_1,(d_{p_1},d_{q_1})),(y_2,(d_{p_2},d_{q_2})),\ldots,(y_N,(d_{p_N},d_{q_N}))$$

where $(d_{p_k}, d_{q_k})$ is the pair of documents to compare and $y_k \in \{0, 1\}$ is the label indicating whether the two documents are near duplicate or not. Following the vector construction described in Equation (7), the documents in the training examples $d_{p_1}, d_{q_1}, \ldots, d_{p_N}, d_{q_N}$ are mapped to vectors $v_{p_1}, v_{q_1}, \ldots, v_{p_N}, v_{q_N}$ correspondingly. This setting makes the model output the similarity score close to the label. In other words, a perfect model assigns a similarity score of 1 to a pair of two near-duplicate documents and 0 to others. The loss functions set forth above in equations (4) and (5) may be used, (substituting $\overline{\lambda}$).

Note that computing an exact similarity score may not be necessary in some duplication detection applications, such as when ranking near-duplicate documents with higher similarity scores, compared to other unrelated pairs of documents. A desired decision threshold may be selected for the target application. Thus, the setting of learning the preference ordering computes a loss function that focuses on correct pairwise comparisons. A training set of N examples in this setting can be denoted as $$\{(y_1,(x_{a_1},x_{b_1})),(y_2,(x_{a_2},x_{b_2})),\ldots,(y_N,(x_{a_N},x_{a_N}))\}$$

where $$x_{a_k} = (d_{p_{a_k}}, d_{q_{a_k}}) \text{ and } x_{b_k} = (d_{p_{b_k}}, d_{q_{b_k}})$$

are two pairs of documents and $y_k \in \{0, 1\}$ indicates the pairwise order preference, where 1 means $x_{a_k}$ should be ranked higher than $x_{b_k}$ and 0 otherwise. One suitable loss function for this setting (corresponding to equation (6)) is $$L(\overline{\lambda})=\Sigma_{k=1}^N \log(1+\exp(-y_k \cdot \Delta_k - (1 y_k) \cdot (-\Delta_k))) \quad (8)$$

where $\Delta_k$ is the difference of the similarity scores of two document pairs, computed based on the corresponding vectors. Namely, $$\Delta_k = f_{sim}(v_{a_k}, v_{q_{a_k}}) - f_{sim}(v_{b_k}, v_{q_{b_k}}).$$

Note that the regularization term $$\frac{\alpha}{2}\|\lambda\|^2$$

may be used for performance reasons.

With respect to generating document signatures, in many applications, the near duplicate detection mechanism processes a relatively large collection of documents, whereby efficiency is needed. To this end, the representation of a document needs to be relatively concise so that both the storage space and the computation time can be reduced. Note that while the real-valued k-gram vector with weights tuned by the above-described framework computes accurate similarity scores, the raw representation consumes relatively large memory space, especially for long documents.

Thus, one implementation provides dimensionality reduction to the learned vectors. The weights in each vector can be interpreted as the importance scores of the corresponding k-grams, whereby one straightforward way to shrink the vector size is by eliminating k-grams with low weights. Efficient similarity computation can be supported by techniques like pruned inverted index; however, having variable size document representations is not necessarily desirable. Further, while low-weight k-grams are generally not as important, they still contain information that may affect the similarity measure, and the information lost resulting from their elimination is unclear.

Thus, as an alternative, locality sensitive hashing (LSH) schemes may be used to map a raw vector to a sequence of hash values as the document signature. An LSH scheme has the defining property that, when $f_{sim}(\cdot,\cdot)$ is a given similarity function defined on the collection of objects O, a distribution on a family H of hash functions operating on O is a locality sensitive hashing scheme if for x, y∈O, $$Prob_{h \in H}[h(x)=h(y)]=f_{sim}(x,y).$$

Using this scheme, hash functions $h_1, h_2, \ldots, h_m$ drawn from H are applied to raw vectors to encode them into signatures of m hash values. The similarity score of two documents is derived by counting the number of identical hash values, divided by m. As m increases, this scheme approximates asymptotically the true similarity score given by the specific function $f_{sim}$. Because the similarity functions that the learning method optimizes for are cosine and Jaccard, the corresponding LSH schemes are applied when generating signatures. For the cosine function, the random hyperplane based hash function is used; for a given collection of vectors in $R^d$, each hash function is created by first choosing a random vector $\bar{r}$ from the d-dimensional Gaussian distribution. When applied to a vector $\bar{u} \in R^d$, the corresponding binary hash function $h_{\bar{r}}$ returns 1 if the dot product $\bar{r} \cdot \bar{u} \geq 0$, otherwise it is 0. For vectors $\bar{u}$ and $\bar{v}$, this LSH scheme has the following property:

$$\text{Prob}[h_{\bar{u}} = h_{\bar{v}}] = 1 - \frac{\cos^{-1}}{\pi}(\bar{u}, \bar{v}).$$

Note that because the function approximated by this LSH scheme is a monotonic mapping of the cosine function, for the purpose of near-duplicate detection, the difference compared to using the cosine function is only a different decision threshold. When applying this scheme to k-gram vectors, each k-gram in the vocabulary is associated with m different random numbers drawn from the Gaussian distribution. The signature of each vector/document is a bit-string of m bits. The value of the i-th bit is decided by the sign of summing the product of the i-th random number and the weight of each k-gram. This scheme works for both binary and real vectors, and the number of bits (i.e., m) does not need to increase when handling real vectors.

For the Jaccard function, the LSH scheme used is the min-hash function. To handle real k-gram vectors, each real-valued weight is transferred to a binary vector. The weight of each k-gram in the vector is multiplied by an integer and then the number is bucketed and mapped to a bit-string. The original real vector thus becomes a binary vector by concatenating these bit-strings.

Note that it is impractical to choose a hash function uniformly among all the possible functions. Therefore, the search may be limited among a specific class of functions (e.g., linear in one implementation). Then, each hash function $h_i$ is defined by two random numbers $\alpha_i$ and $\beta_i$ that are smaller than the length of the mapped binary vectors. Let X be the set of indices of the "1" bits in vector $\bar{u}$. The i-th hash value of this vector is defined as $h_i(\bar{u})=\min_{x \in X}(\alpha_i \cdot x + \beta_i \mod p)$ where p is the first prime number bigger than the length the mapped binary vector. Similarly, a complete document signature comprises m such min-hash values, and the Jaccard coefficient is approximated by the fraction of identical hash values in the corresponding signature vectors.

EXEMPLARY OPERATING ENVIRONMENT

Figure 5:
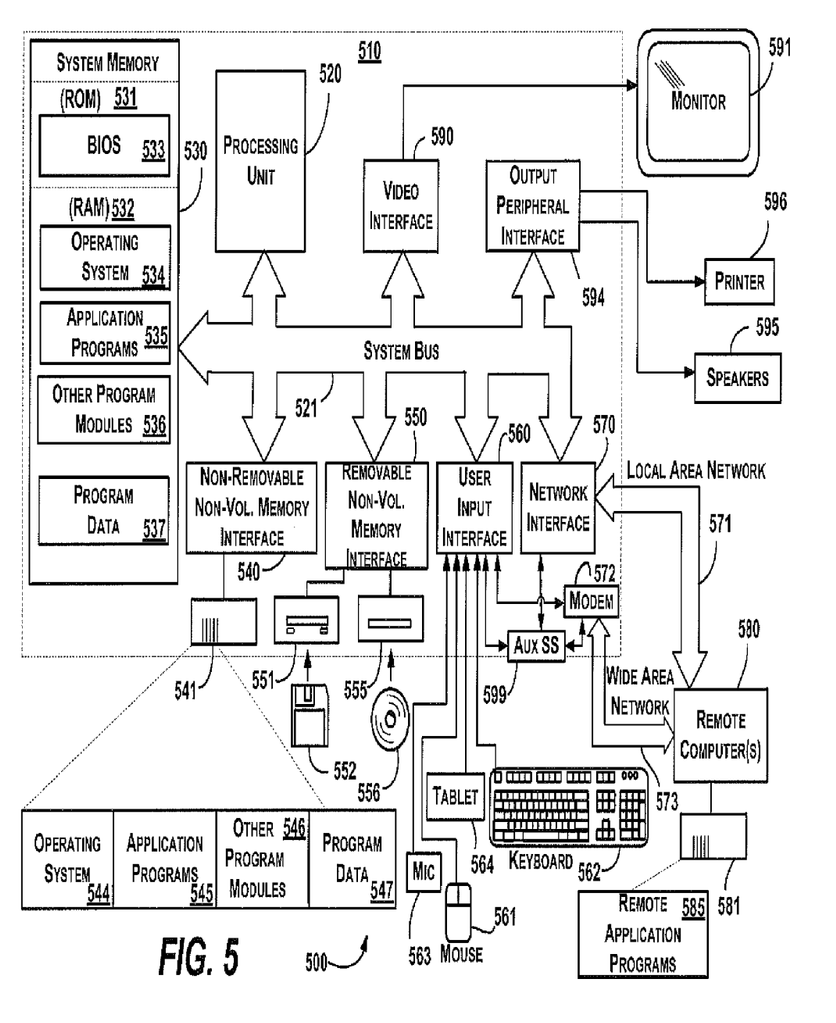
FIG. 5 shows an illustrative example of a computing environment into which various aspects of the present invention may be incorporated.

FIG. 5 illustrates an example of a suitable computing and networking environment 500 on which the examples of FIGS. 1-4 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a computer-implemented method performed on at least one processor, comprising:
    creating a similarity measure between objects, each object represented by term vectors, including learning values of the term vectors by:
        extracting terms from each object for generating a plurality of features from each of the extracted terms;
        for each of the extracted terms, creating a term vector by including one or more of the plurality of features, the one or more of the plurality of features of the term vector being associated with one or more model parameters;
        creating a term-weighting function including the term vectors associated with the extracted terms;
        learning the one or more model parameters of the term vectors of the term-weighting function that optimize a loss function to construct a learned term-weighting function; and
    applying the learned term-weighting function to determine similarity between the objects.

2. The computer-implemented method of claim 1 further comprising, selecting or defining the term weighting function of the term vectors with the model parameters to learn.

3. The computer-implemented method of claim 1 further comprising, defining the loss function by comparing two pairs of the term vectors to their labels, or by comparing a pair of the term vectors to its label.

4. The computer-implemented method of claim 1 further comprising, receiving input data, and using the term-weighting function to produce a similarity score corresponding to the input data.

5. The computer-implemented method of claim 1 further comprising, using the term-weighting function to detect near duplicate unstructured documents or pseudo-documents.

6. The computer-implemented method of claim 1 further comprising, selecting or scoring terms or k-grams to create signatures.

7. In a computing environment, a system comprising; a memory, wherein the memory comprises computer useable program code; and
    one or more processing units, wherein the one or more processing units execute the computer useable program code configured to implement a model that produces a similarity measure between objects, each of the object represented by term vectors, including learning values of the term vectors by:
        extracting terms from each object for generating a plurality of features from each of the extracted terms;
        for each of the extracted terms, creating a term vector by including one or more of the plurality of features, the one or more of the plurality of features of the term vector being associated with one or more model parameters;
        creating a term-weighting function including the term vectors associated with the extracted terms; and
        learning the one or more model parameters of the term vectors of the term-weighting function that optimize a loss function to construct a learned term-weighting function.

8. The system of claim 7, wherein the plurality of features comprise an HTML feature set.

9. The system of claim 7, wherein the model produces the similarity measure via the term-weighting function, the term-weighting function comprising a cosine function, Jaccard function, or kernel function.

10. The system of claim 7, wherein the objects comprise documents, and the term vectors represent a document wherein the term vector corresponds to a term, a k-gram, or a skipped k-gram.

11. The system of claim 7, wherein the term vector includes a functional form of the term vector with the one or more model parameters learn, wherein the functional form comprises a weighted linear function, a polynomial function or an exponential function of the weighted linear sum, and wherein the weights comprise the one or more model parameters to learn.

12. The system of claim 7, wherein the one or more processing units execute the computer useable program code and are further configured to implement labeled training data including a label that indicates a similarity between a pair of objects, or a plurality of pairs of objects.

13. The system of claim 7, wherein the plurality of features include term frequency, document frequency, or query log frequency, or any combination of term frequency, document frequency, or query log frequency.

14. The system of claim 7, wherein the plurality of features include a feature indicative of whether a term is capitalized, or one or more features related to term position, or both a feature indicative of whether a term is capitalized and/or one or more features related to term position.

15. The system of claim 7, wherein the plurality of features include a lexical form of a term or k-gram.

16. The system of claim 7, wherein the plurality of features include a feature indicative of whether a term is in an anchor text, a feature indicative of whether a term is part of the URL, a feature indicative of whether a term is part of a title, or a feature indicative of whether a term is in a meta section, or any combination of a feature indicative of whether a term is in an anchor text, a feature indicative of whether a term is part of the URL, a feature indicative of whether a term is part of a title, or a feature indicative of whether a term is in a meta section.

17. The system of claim 7, wherein the similarity measure is used in detecting near-duplicate unstructured documents, images, email messages or pseudo-documents.

18. A computing device having computer-executable instructions stored thereon, wherein the computer-executable instructions on execution perform operations comprising:
   extracting terms from an object;
   generating a plurality of features from the extracted terms, for each of the extracted terms, creating a term vector including one or more of the plurality of features, the one or more of the plurality of features of the term vector being associated with one or more model parameters;
   creating a term-weighting function including the term vectors associated with the extracted terms; and
   learning the one or more model parameters of the term vectors of the term-weighting function that optimize a loss function to construct a learned term-weighting function.

19. The computing device of claim 18 having further computer-executable instructions comprising, learning the term-weighting function, including processing training data to extract terms for the term vectors, generating the plurality of features of the extracted terms, and using the plurality of features and labels associated with training data to learn the model parameters of the term-weighting function by optimizing call the loss function.

20. The computing device of claim 18 having further computer-executable instructions comprising, defining the term-weighting function and the loss function, and obtaining a gradient of the loss function in terms of the model parameters to optimize.

* * * * *